United States Patent
Popa et al.

(10) Patent No.: US 9,207,335 B2
(45) Date of Patent: Dec. 8, 2015

(54) SELF POWERED NEUTRON DETECTOR

(71) Applicant: Westinghouse Electric Company LLC, Cranberry Township, PA (US)

(72) Inventors: Frank D. Popa, Murrysville, PA (US); Stuart M. McDonald, Mars, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 700 days.

(21) Appl. No.: 13/872,186

(22) Filed: Apr. 29, 2013

(65) Prior Publication Data

US 2014/0321592 A1    Oct. 30, 2014

(51) Int. Cl.
 G01T 3/00 (2006.01)
 G21C 17/108 (2006.01)
 G21C 17/10 (2006.01)

(52) U.S. Cl.
 CPC .............. G01T 3/006 (2013.01); G21C 17/108 (2013.01); *G21C 17/102* (2013.01)

(58) Field of Classification Search
 CPC ..... G01T 3/006; G21C 17/108; G21C 17/102
 USPC ............... 376/254, 255; 250/370.04, 370.05, 250/390.01
 See application file for complete search history.

(56) References Cited

U.S. PATENT DOCUMENTS

| 4,568,514 | A | * | 2/1986 | Lingren | G21C 17/108 376/255 |
| 4,667,107 | A | * | 5/1987 | Wang | G01T 3/00 376/154 |
| 5,745,538 | A | | 4/1998 | Heibel | |
| 2012/0177166 | A1 | | 7/2012 | Seidel et al. | |
| 2012/0223242 | A1 | | 9/2012 | Brown et al. | |

FOREIGN PATENT DOCUMENTS

| JP | 2000230981 A | 8/2000 |
| JP | 2010281703 A | 12/2010 |
| KR | 100314901 B1 | 2/2002 |

OTHER PUBLICATIONS

International Search Report and Written Opinion of the International Searching Authority for PCT/US2014/031794 dated Jan. 9, 2015 (Forms PCT/ISA/220, PCT/ISA/210, PCT/ISA/237).

* cited by examiner

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

A self-powered neutron detector having an emitter with a slightly negative bias voltage that assures that an increase in the electrons that enter the insulator are counted and decreases or eliminates the gamma induced prompt signal. Variations in the size of the bias is used as a diagnostic tool to estimate the gamma induced prompt signal.

18 Claims, 7 Drawing Sheets

SELF POWERED NEUTRON DETECTOR

BACKGROUND

1. Field

The present invention pertains generally to apparatus for monitoring radiation within the core of a nuclear reactor and, more particularly, to such apparatus that is self-powered.

2. Related Art

In many state of the art nuclear reactor systems, in-core sensors are employed for measuring the radioactivity within the core at a number of axial elevations and radial locations. These sensors are used to measure the axial and radial distribution of the power inside the reactor core. This power distribution measurement information is used to determine whether the reactor is operating within nuclear power distribution limits. The typical in-core sensor used to perform this function in modem nuclear reactors is a self-powered detector that produces an electric current that is proportional to the amount of fission occurring around it. This type of sensor does not require an outside source of electrical power to produce the current and is commonly referred to as a self-powered detector and is more fully described in U.S. Pat. No. 5,745,538, issued Apr. 28, 1998, and assigned to the Assignee of this invention. FIG. 1 provides a diagram of the mechanisms that produce the current I(t) in a self-powered detector element 10. A neutron sensitive material, such as vanadium, is employed for the emitter element 12 and emits electrons in response to neutron irradiation. Typically, the self-powered detectors are grouped within instrumentation thimble assemblies within the fuel assemblies. A representative in-core instrumentation thimble assembly is shown in FIG. 2. The signal level generated by the essentially non-depleting neutron sensitive emitter element 12 shown in FIG. 1, is low, however, a single full core length neutron sensitive emitter element provides an adequate signal that can be processed for determining core power at the sensor's location. The proportions of the signal from the full length emitter attributable to various axial regions of the core are determined from apportioning the signal generated by different lengths of primarily neutron sensitive elements 14 which define the axial regions of the core and are shown in FIG. 2. The apportioning signals are ratioed which eliminates much of the effects of the delayed gamma radiation due to fission products. The in-core instrumentation thimble assemblies also include a thermocouple 18 for measuring the temperature of the coolant exiting the fuel assemblies. The electrical signal output from the self-powered detector elements and the thermocouple in each in-core instrumentation thimble assembly in the reactor core are collected at the electrical connector 20 and sent to a location well away from the reactor for final processing and use in producing the measured core power distribution.

FIG. 3 shows an example of a core monitoring system presently offered for sale by Westinghouse Electric Company LLC, Cranberry Township Pennsylvania, with the product name WINCISE™ that employs fixed in-core instrumentation thimble assemblies 16 within the instrument thimbles of fuel assemblies within the core to measure the core's power distribution. Cabling 22 extends from the instrument thimble assembly 16 through the containment seal table 24 to a signal processing cabinet 26 where the outputs are conditioned, digitized and multiplexed and transmitted through the containment walls 28 to a computer work station 30 where they can be further processed and displayed. The thermocouple signals from the in-core instrumentation thimble assemblies are also sent to a reference junction unit 32 which transmits the signals to an inadequate core cooling monitor 34 which communicates with the plant computer 36 which is also connected to the work station 30. Because of the hostile environment, the signal processing cabinet 26 has to be located a significant distance away from the core and the signal has to be sent from the detector 16 to the signal processing cabinet 26 through specially constructed cables that are extremely expensive and the long runs reduce the signal to noise ratio. Unfortunately, these long runs of cable have proved necessary because the electronics for signal processing has to be shielded from the highly radioactive environments surrounding the core region.

In previous nuclear plant designs, the in-core detectors enter the reactor vessel from the lower hemispherical end and enter the fuel assemblies' instrumentation thimble from the bottom fuel assembly nozzle. In at least some of the current generation of nuclear plant designs, such as the AP 1000® nuclear plant, the in-core monitoring access is located at the top of the reactor vessel, which means that during refueling all the in-core instrument thimble assemblies will need to be removed from the core before accessing the fuel. In either arrangement, the long runs of signal cable are necessary to isolate the electronics from the harmful effects of radiation emanating from the core.

Self-powered detectors are generally coaxial in design with a center emitter wire, an annular alumina insulator and an outer metallic sheath. By some physical process the central wire emits electrons, some of which form the detector current. Some electrons slow down in the insulator leading to a space charge therein. The emitter and sheath are more or less at ground potential. The radius in the insulator where the minimum (most negative) potential occurs determines if charges that come to rest within the insulator are counted or not. For example, a Compton electron enters the insulator from the sheath with 300 keV of energy and comes to rest (due to collisions) in the insulator just inside the (probably less in magnitude than −1 volt) minimum potential radius. This particular electron is then directed to the emitter by the potential inside the insulator. As such, it creates a charge flow that subtracts from the total detector current.

Existing self-powered detectors have a reduced sensitivity due to the electrical potential trough that builds up in the insulating annulus. This is caused by a portion of the Compton electrons and beta particles coming to rest in the insulator due to kinetic interactions. The minimum potential formed by these particles is small, perhaps not even minus one volt, but is enough to direct the at rest electrons on the inside of the insulator back to the emitter. These charges are then not counted as they have finally not escaped the emitter. Although the minimum potential is small, it typically occurs at a depth in the insulator that takes 100's of keV of kinetic energy to reach. This then precludes low energy electrons or betas from contributing to the detector current. Similarly, the predominantly low energy photoelectric electrons are not able to penetrate the insulator to a depth on the outer side of the minimum potential. Consequently, they too are not counted.

It is an object of this invention to improve the sensitivity of self-powered neutron detectors.

Furthermore, it is an object of this invention to increase the sensitivity of the self-powered detectors without substantially altering the configuration of existing systems.

SUMMARY

These and other objects are achieved by employing a self-powered neutron detector having a neutron sensitive emitter element and an annular insulator substantially coaxially disposed around the emitter element. An outer electrically conductive sheath is disposed around the annular insulator and a negative bias voltage is applied across the neutron sensitive emitter. The negative bias voltage is approximately between 1 and 30 volts, and, more preferably, between 1 and 2 volts. In one embodiment, the self-powered detector includes a coating of selenium around at least a portion of the outside of the emitter. Preferably, the negative bias voltage is adjustable to identify the gamma induced part of the output signal as a fraction of the beta induced fraction.

The invention further contemplates a nuclear fuel assembly having an instrument thimble housing such as a self-powered neutron detector. The invention further contemplates a nuclear reactor system including a fuel assembly having an instrument thimble housing such a self-powered detector.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

The primary side of many nuclear power generating systems which are cooled with water under pressure comprises a closed circuit which is isolated from and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

Figure 4:
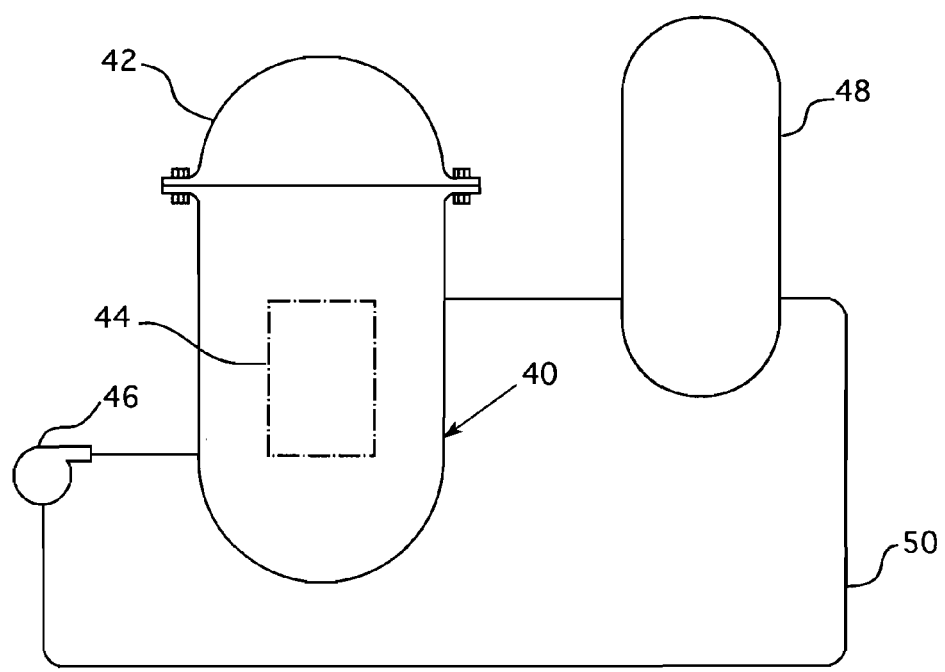
FIG. 4 is a simplified schematic of a nuclear reactor system to which this invention can be applied.

For the purpose of illustration, FIG. 4 shows a simplified nuclear reactor primary system, including a generally cylindrical reactor pressure vessel 40 having a closure head 42 enclosing a nuclear core 44. A liquid reactor coolant, such as water, is pumped into the vessel 40 by pump 46 through the core 44 where heat energy is absorbed and is discharged to a heat exchanger 48, typically referred to as the steam generator, in which heat is transferred to a utilization circuit (not shown), such as a steam driven turbine generator. The reactor coolant is then returned to the pump 46 completing the primary loop. Typically, a plurality of the above described loops are connected to a single reactor vessel 40 by reactor coolant piping 50.

Figure 5:
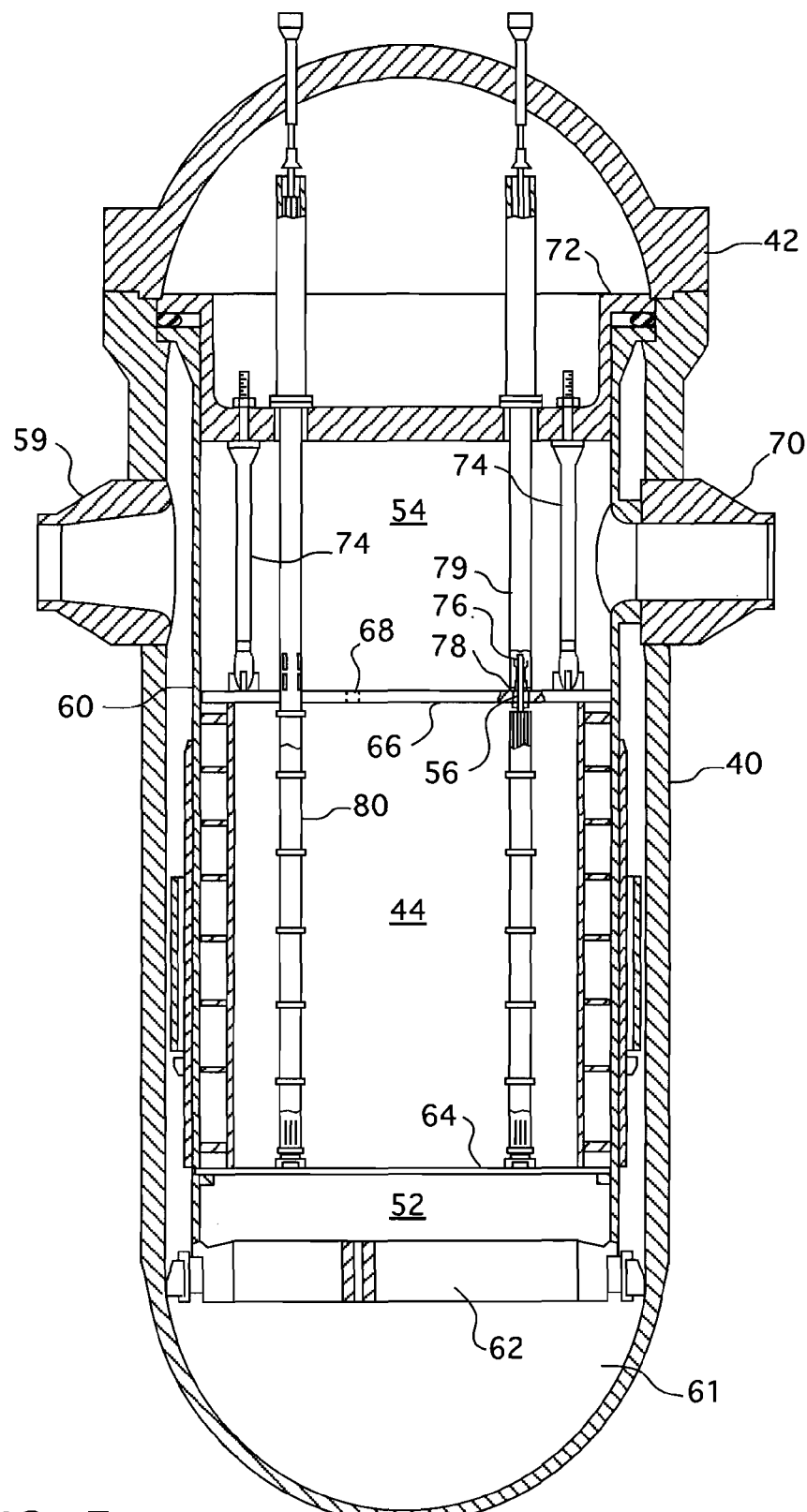
FIG. 5 is an elevational view, partially in section, of a nuclear reactor vessel and interior components to which this invention can be applied.

An exemplary reactor design which can benefit from this invention is shown in FIG. 5. In addition to the core 44 comprised of a plurality of parallel, vertical, co-extending fuel assemblies 80, for purposes of this description, the other vessel internal structures can be divided into the lower internals 52 and the upper internals 54. In conventional designs, the lower internals function to support, align and guide core components and instrumentation as well as direct flow within the vessel. The upper internals 54 restrain or provide a secondary restraint for the fuel assemblies 80 (only two of which are shown in FIG. 5 for simplicity), and support and guide instrumentation and components, such as control rods 56. In the exemplary reactor shown in FIG. 5, coolant enters the reactor vessel 40 through one or more inlet nozzles 59, flows down through an annulus between the vessel 40 and the core barrel 60, is turned 180° in a lower reactor vessel plenum 61, passes upwardly through a lower support plate 62 and a lower core plate 64 upon which the fuel assemblies 80 are seated, and through and about the assemblies. In some designs, the lower support plate 62 and the lower core plate 64 are replaced by a single structure, the lower core support plate, that has the same elevation as 62. Coolant exiting the core 44 flows along the underside of the upper core plate 66 and upwardly and through a plurality of perforations 68 in the upper core plate 66. The coolant then flows upwardly and radially to one or more outlet nozzles 70.

The upper internals 54 can be supported from the vessel 40 or the vessel head 42 and includes an upper support assembly 72. Loads are transmitted between the upper support assembly 72 and the upper core plate 66 primarily by a plurality of support columns 74. Each support column is aligned above a selected fuel assembly 80 and perforations 68 in the upper core plate 66.

The rectilinearly moveable control rods 56 typically include a drive shaft 76 and a spider assembly 78 of neutron poison rods that are guided through the upper internals 54 and into aligned fuel assemblies 80 by control rod guide tubes 79.

Figure 6:
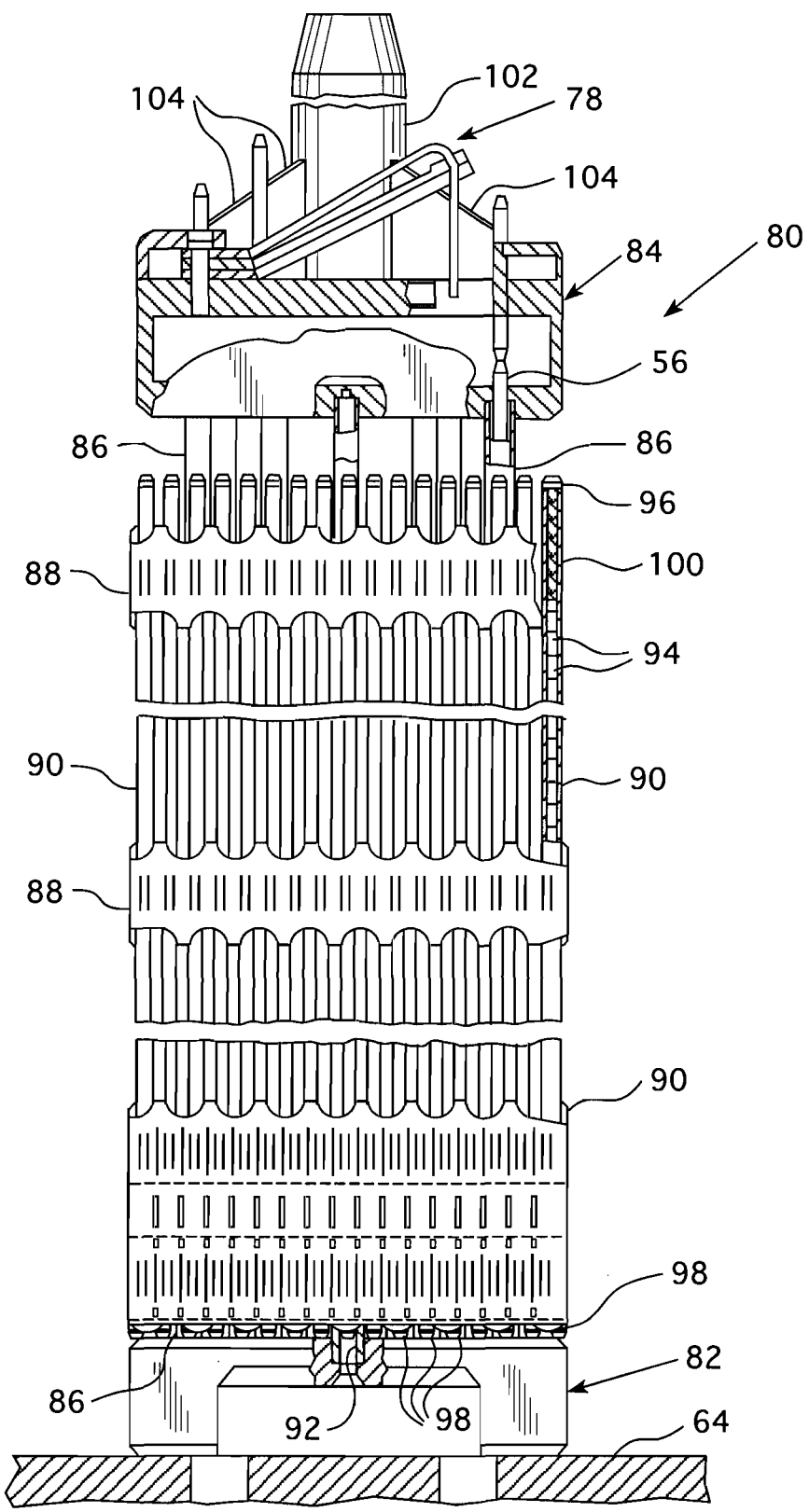
FIG. 6 is an elevational view, partially in section of a nuclear fuel assembly that contains the in-core nuclear instrument thimble assembly of this invention.
Figure 7:
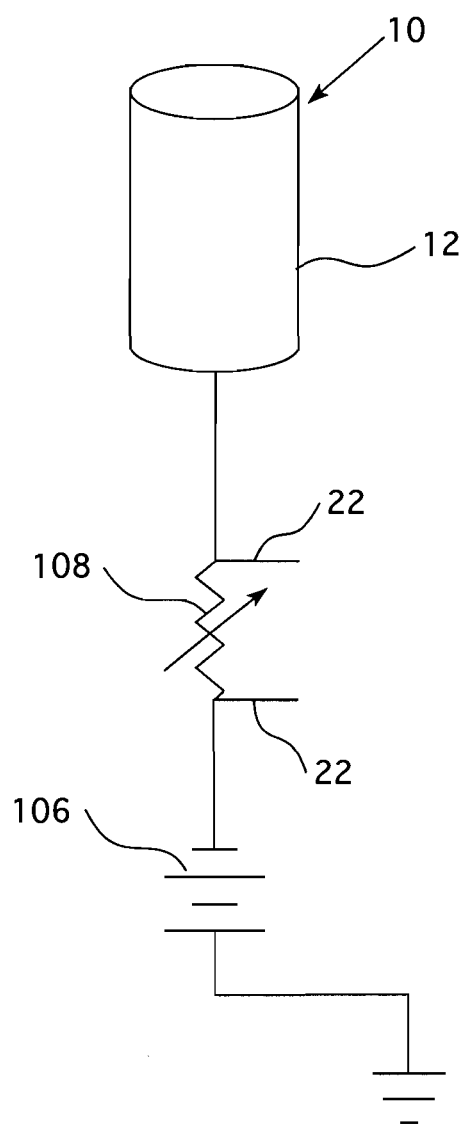
FIG. 7 is a schematic circuitry diagram illustrating the negative bias voltage applied to the emitter of the self-powered detector of this invention.

FIG. 6 is an elevational view represented in vertically shortened form, of a fuel assembly being generally designated by reference character 80. The fuel assembly 80 is the type used in a pressurized water reactor and has a structural skeleton which at its lower end includes a bottom nozzle 82. The bottom nozzle 82 supports the fuel assembly 80 on the lower core support plate 64 in the core region of the nuclear reactor. In addition to the bottom nozzle 82, the structural skeleton of the fuel assembly 80 also includes a top nozzle 84 at its upper end and a number of guide tubes or thimbles 86, which extend longitudinally between the bottom and top nozzles 82 and 84 and at opposite ends are rigidly attached thereto.

The fuel assembly 80 further includes a plurality of transverse grids 88 axially spaced along and mounted to the guide thimbles 86 (also referred to as guide tubes) and an organized array of elongated fuel rods 90 transversely spaced and supported by the grids 88. Although it cannot be seen in FIG. 6, the grids 88 are conventionally formed from orthogonal straps that are interleaved in an egg-crate pattern with the adjacent interface of four straps defining approximately square support cells through which the fuel rods 90 are supported in transversely spaced relationship with each other. In many conventional designs, springs and dimples are stamped into the opposing walls of the straps that form the support cells. The springs and dimples extend radially into the support cells and capture the fuel rods there between; exerting pressure on the fuel rod cladding to hold the rods in position. Also, the assembly 80 has an instrumentation tube 92 located in the center thereof that extends between and is mounted to the bottom and top nozzles 82 and 84. With such an arrangement of parts, the fuel assembly 80 forms an integral unit capable of being conveniently handled without damaging the assembly of parts.

As mentioned above, the fuel rods 90 in the array thereof in the assembly 80 are held in spaced relationship with one another by the grids 88 spaced along the fuel assembly length. Each fuel rod 90 includes a plurality of nuclear fuel pellets 94 and is closed at its opposite ends by upper and lower end plugs 96 and 98. The fuel pellets 94 are maintained in a stack by a plenum spring 100 disposed between the upper end plug 96 and the top of the pellet stack. The fuel pellets 94 composed of fissile material, are responsible for creating the reactive power of the reactor. The cladding, which surrounds the pellets, functions as a barrier to prevent the fission by-products from entering the coolant and further contaminating the reactor system.

To control the fission process, a number of control rods 56 are reciprocally movable in the guide thimbles 86 located at predetermined positions in the fuel assembly 80. Specifically, a rod cluster control mechanism (also referred to as the spider assembly) 78 positioned above the top nozzle 84 supports the control rods 56. The control mechanism has an internally threaded cylindrical hub member 102 with a plurality of radially extending flukes or arms 104 that with the control rods 56 form the spider assembly 78 that was previously mentioned with respect to FIG. 5. Each arm 104 is interconnected to a control rod 56 such that the control mechanism 78 is operable to move the control rods vertically in the guide thimbles 86 to thereby control the fission process in the fuel assembly 80 under the motor power of control rod drive shaft 76 (shown in FIG. 5) which is coupled to the control rod hub 102, all in a well known manner.

Figure 1:
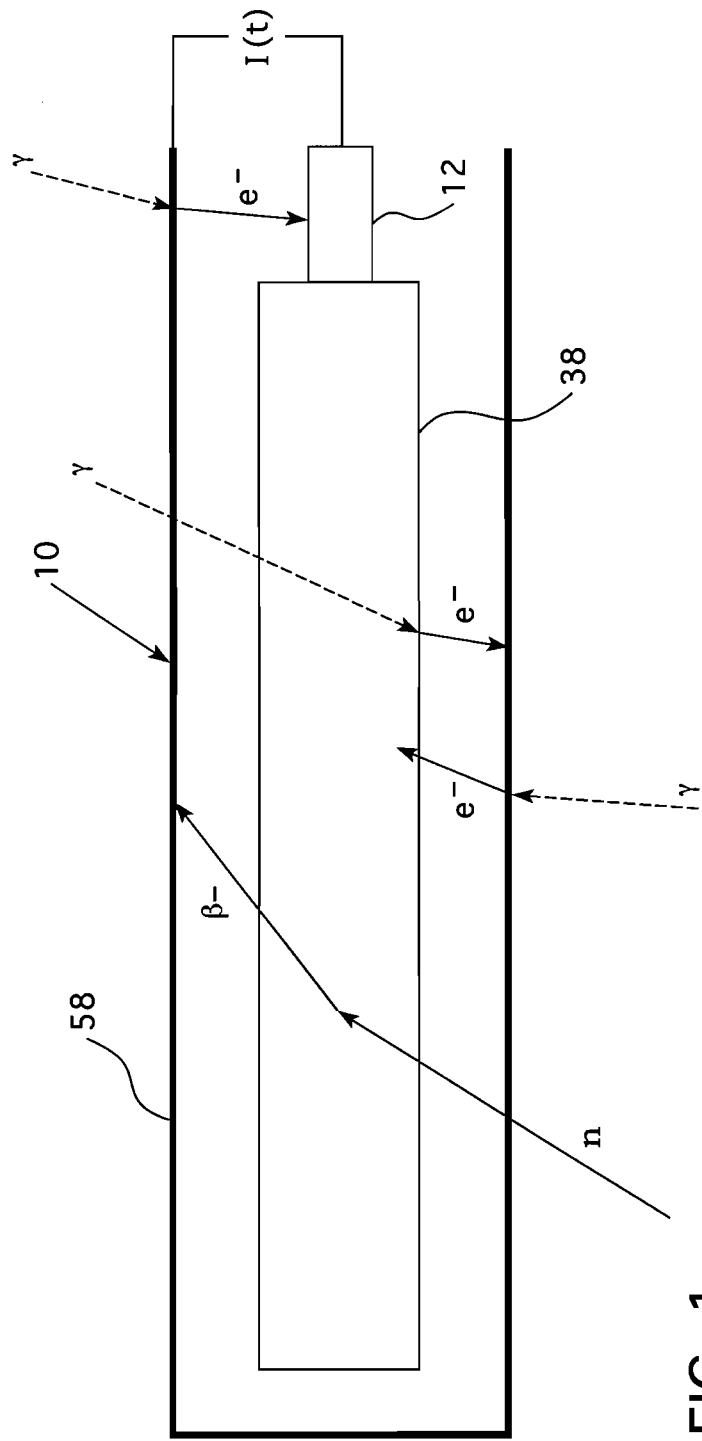
FIG. 1 is a schematic representation of a self-powered irradiation detector.
Figure 2A:
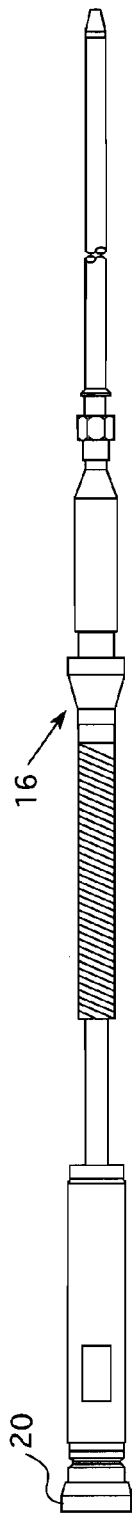
FIG. 2A is a plan view of an in-core instrument thimble assembly which can benefit from this invention.
Figure 2B:
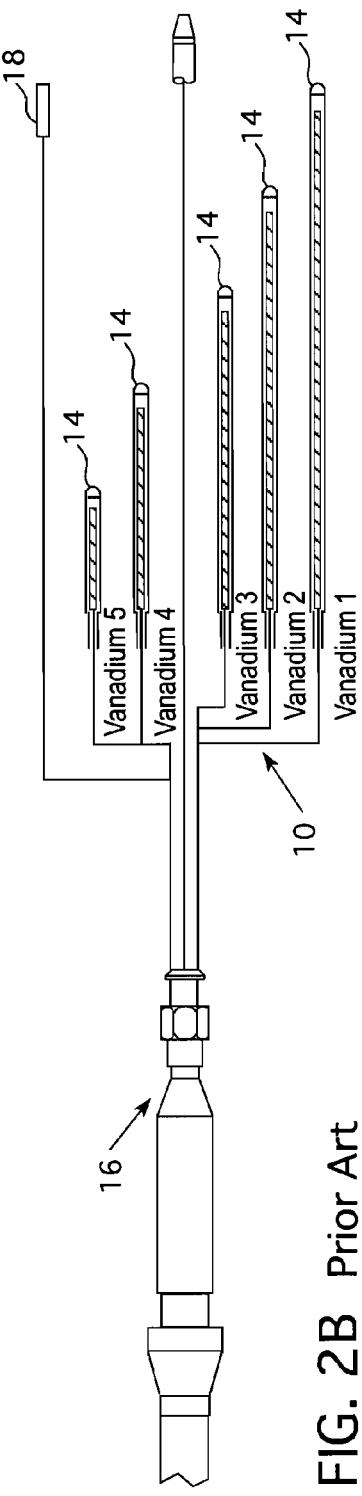
FIG. 2B is a schematic view of the interior of the forward sheath of the in-core instrument thimble assembly of FIG. 2A.
Figure 2C:
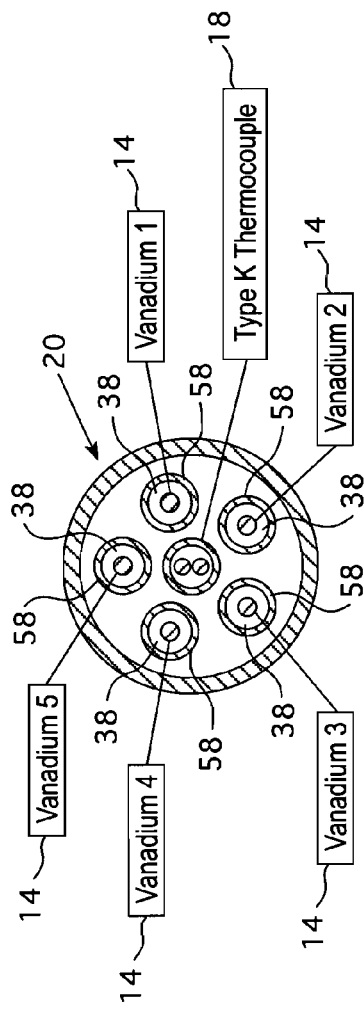
FIG. 2C is a sectional view of the electrical connector at the rear end of the in-core instrument thimble assembly of FIG. 2A.
Figure 3:
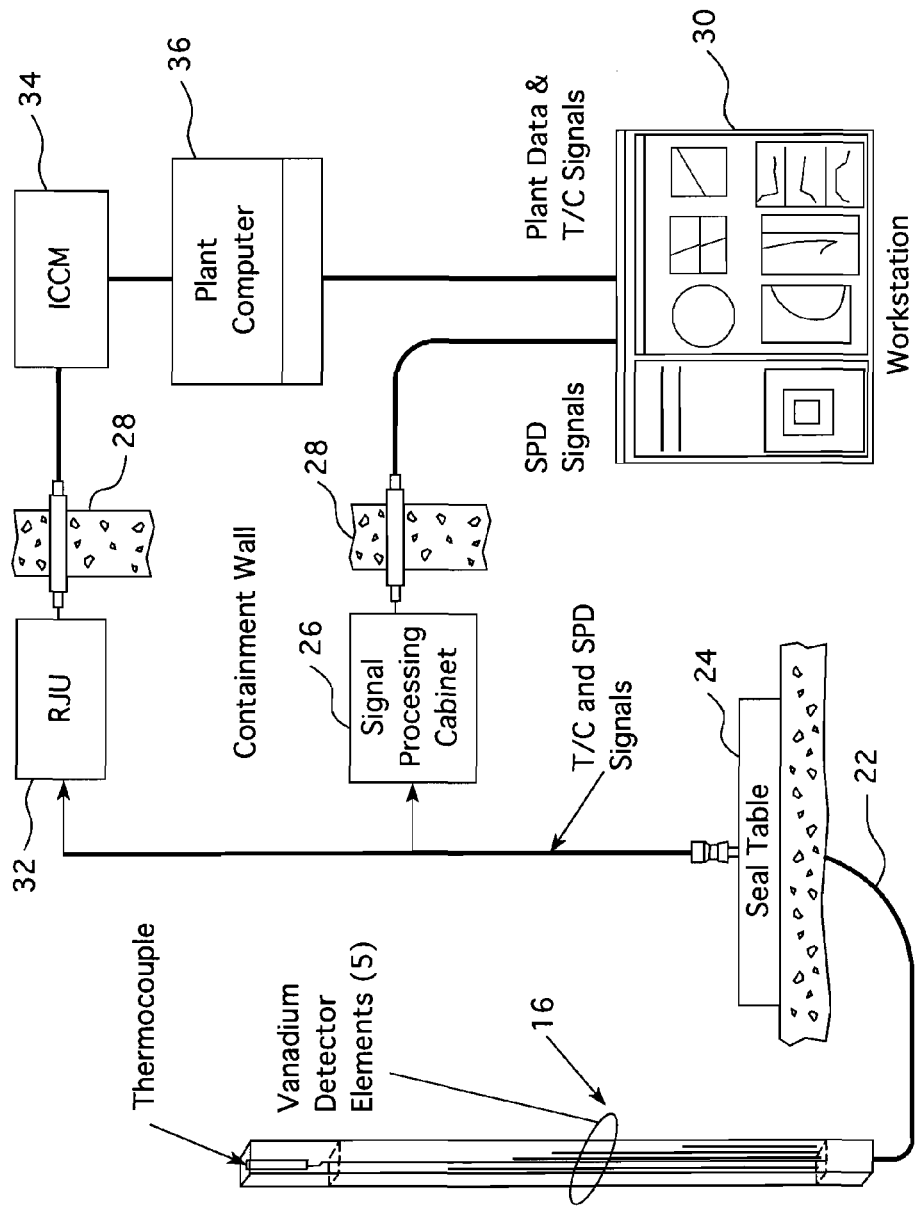
FIG. 3 is a schematic layout of an in-core monitoring system.

This invention provides an improvement to the in-core nuclear instrumentation thimble assemblies 16 that reside within the guide thimbles 86 within the fuel assemblies 80 during reactor operation. In accordance herewith, a negative bias voltage is applied to the detector emitter 12 to improve the sensitivity of the detector 10. Just a few volts will be sufficient to overcome the magnitude of the potential in the insulator 38, which is small, but sufficient to prevent some of the electrons leaving the emitter from reaching the outer sheath. This will then make the minimum potential occur at the surface of the emitter/inner surface of the insulator and any electron or beta that escapes the emitter will be propelled to the detector sheath 58 (shown in FIGS. 1 and 2), where it would be counted. As typically above 25 percent of the beta particles are stopped in the insulator 38, this would be a large increase in sensitivity. Also, photoelectrons and the associated Auger electrons would often be counted when created at the surface of the emitter. As the cross section for photoelectrons increases rapidly as the photon energy decreases, and as the number of photons in the core is high at low energies, this would be an additional substantial increase in the detector sensitivity beyond that involving the betas.

There would also be a benefit in simplifying the use and interpretation of the detector signals. At first the increase in detector sensitivity by counting more electrons formed from external gammas would tend to cancel the negative contribution they have to detector current. That is, one of the issues that arises in employing vanadium detectors is that part of the beta generated signal is canceled by Compton electrons generated externally to the detector. In core measurement, this results in the sensitivity of the detectors varying from location to location in the core, notably as a function of enrichment. Any cancellation of the external gamma signal by other external gamma interactions, such as by photoelectrons, would tend to reduce this effect. Also, of concern is the fraction of the vanadium detector signal that is prompt. This makes the conversion of the signal to "instantaneous" power problematic as any signal processing algorithm has to deal with signal contributions on different time scales. Cancelling the prompt signal is then a benefit. A further benefit exists if the external gamma signal were "over cancelled"; counteracted to the degree that the net external gamma induced signal is now adding to the sensitivity. The concern over the prompt signal is exacerbated by the fact that it has the opposite sign to the beta signal; consequentially, in rapid transients the detector signal will initially change in the opposite direction to the power change. Consequently, forcing these contributions to have the same sign would also be beneficial.

The foregoing discussion addresses the effects of increasing the outgoing signal, the signal that adds to the beta decay signal, caused by external gammas. There would also be a reduction in the incoming external gamma induced current. Due to the negative bias 106, the Compton electrons that are formed in the sheath 58 by the external gammas would have to penetrate through the entire thickness of the insulator 38 to the smaller radius emitter 12. Thus, there would be a decrease in "external gamma induced signal cancelling," due to both the requirement for higher energy needed to penetrate the entire insulation thickness and the smaller radius target area in the emitter.

For a cobalt detector, a bias voltage between approximately 1 and 30 volts, and preferably 1 and 2 volts, would allow the 58.6 keV internal transition electrons to be counted (although as these occur with a 10.47 minute half life, this would only be beneficial for steady state measurements).

Given that the photoelectrons would now be counted, coating the outside of the emitter 12 with a substance such as selenium that easily emits photoelectrons will be a benefit to sensitivity. Another benefit of applying the negative voltage bias 106, is that varying the bias, one could get additional information on the origins of the detector signal. For example, removing the bias would affect the external gamma induced current more than it would affect the beta decay current (as the energy of the associated electrons would be less for the external gamma induced current). One could use this, to measure the variation of the external gamma induced part of the signal as a fraction of the beta induced fraction. This information could be used to correct the external gamma induced signal in an in-core flux map.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A self-powered neutron detector comprising:
   a neutron sensitive emitter element;
   an annular insulator substantially coaxially disposed around the emitter element;

an outer electrically conductive sheath disposed around the annular insulator; and a negative bias voltage applied to the neutron sensitive emitter.

2. The self-powered neutron detector of claim 1 wherein the negative bias voltage is approximately between 1 and 30 volts.

3. The self-powered neutron detector of claim 2 wherein the negative bias voltage is approximately between 1 and 2 volts.

4. The self-powered detector of claim 1 including a coating of a material that enhances the photoemissivity of the emitter, around at least a portion of the outside of the emitter.

5. The self-powered detector of claim 4 wherein the coating comprises selenium.

6. The self-powered detector of claim 1 including means for varying the negative bias voltage.

7. A nuclear fuel assembly having an instrument thimble housing a self-powered neutron detector comprising:

a neutron sensitive emitter element;

an annular insulator substantially coaxially disposed around the emitter element;

an outer electrically conductive sheath disposed around the annular insulator; and a negative bias voltage applied across the neutron sensitive emitter.

8. The nuclear fuel assembly of claim 7 wherein the negative bias voltage is approximately between 1 and 30 volts.

9. The nuclear fuel assembly of claim 8 wherein the negative bias voltage is approximately between 1 and 2 volts.

10. The nuclear fuel assembly of claim 7 including a coating of a material that enhances the photoemissivity of the emitter, around at least a portion of the outside of the emitter.

11. The nuclear fuel assembly of claim 10 wherein the coating comprises selenium.

12. The self-powered detector of claim 7 including means for varying the negative bias voltage.

13. A nuclear reactor system including a fuel assembly having an instrument thimble housing a self-powered detector comprising:

a neutron sensitive emitter element;

an annular insulator substantially coaxially disposed around the emitter element;

an outer electrically conductive sheath disposed around the annular insulator; and a negative bias voltage applied across the neutron sensitive emitter.

14. The nuclear reactor system of claim 13 wherein the negative bias voltage is approximately between 1 and 30 volts.

15. The nuclear reactor system of claim 14 wherein the negative bias voltage is approximately between 1 and 2 volts.

16. The nuclear reactor system of claim 13 including a coating of a material that enhances the photoemissivity of the emitter, around at least a portion of the outside of the emitter.

17. The nuclear reactor system of claim 16 wherein the coating comprises selenium.

18. The self-powered detector of claim 13 including means for varying the negative bias voltage.

\* \* \* \* \*